Patented Feb. 27, 1945

2,370,588

UNITED STATES PATENT OFFICE 2,370,588

ORGANIC PERCARBONATES

Franklin Strain, Norton Center, Ohio, assignor to Pittsburgh Plate Glass Company, Pittsburgh, Pa., a corporation of Pennsylvania No Drawing. Application October 22, 1942, Serial No. 463,005

5 Claims. (Cl. 260—453)

This invention relates to novel peroxycarbonate esters of an organic hydroxy compound. Many of these compounds have the structural formula:

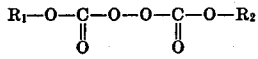

where $R_1$ and $R_2$ are organic radicals derived from alcohols and linked to the oxygen atoms through carbon. The compounds may be prepared by reaction of a peroxide in the presence of an alkali. For example, these compounds may be prepared by reaction of an alkali metal peroxide such as sodium, potassium, or of lithium peroxide with the corresponding haloformates, or by reaction of hydrogen peroxide with an haloformate in the presence of an alkali. Aliphatic percarbonates may be prepared by reaction of a basic metal peroxide such as sodium peroxide with an haloformate such as methyl, ethyl, propyl, butyl, isobutyl, hexyl, lauryl, stearyl, allyl, methallyl, crotyl, dimethallyl, methyl vinyl carbinyl, linallyl, oleyl, cinnamyl, propargyl, butadienyl chloroformates, or the chloroformates of methyl ethyl carbinol, dipropyl carbinol, β-phenyl ethynyl carbinol, β-methyl ethynyl carbinol, β-allyl ethynyl carbinol, β-cyclohexyl ethynyl carbinol, or of hydroxy acids and their esters such as methyl, ethyl, propyl, allyl, crotyl, methallyl, oleyl, glycol, or glycerol lactates, glycolates, hydroxy butyrates, salicylates, ricinoleates, or the corresponding bromoformates of the above alcohols.

Aromatic or other cyclic or heterocyclic percarbonates may be prepared by reaction of sodium peroxides with the haloformates of aromatic hydroxy compounds or alcohols, such as the chloroformates of phenol, naphthol, resorcinol, cresol, toluol, phthalyl alcohol, benzyl alcohol, cyclohexyl alcohol, dioxane diols, bis dioxy cumarone, etc.

The reaction may be conducted using other basic metal peroxides such as barium peroxide, lead peroxide, etc. Alternatively, the reaction may be effected by use of hydrogen peroxide or other inorganic peroxide, or one of the above peroxides in the presence of an alkaline agent capable of reacting with a chloroformate such as sodium hydroxide, sodium carbonate, calcium hydroxide, calcium carbonate, etc.

The reaction is generally conducted in an aqueous medium although nonaqueous solvents may be used, if desired. In order to prevent side reactions the temperature of reaction is generally maintained below 10° C. and the mixture is well agitated during reaction.

Polymeric peroxycarbonates may be prepared by reaction of sodium peroxide with a di-, or polyhaloformate such as ethylene glycol dichloroformate, diethylene glycol dichloroformate, triethylene glycol dichloroformate, 1,2-propylene glycol dichloroformate, trimethylene glycol dichloroformate, butylene glycol dichloroformate, glycerol or alpha methyl glycerol di- or trichloroformate, resorcinol dichloroformate, or dibromoformate, etc.

The peroxycarbonates are generally oily liquids or white solids which are not appreciably soluble in water. Many of these materials are miscible with solvent such as methyl or ethyl alcohol, ethyl ether, acetone, toluene, ethylene glycol bis (allyl carbonate), vinyl acetate, methyl methacrylate, and xylene. The polymeric peroxycarbonates are usually solids or adhesive pastes which are somewhat soluble in organic solvents such as acetone or toluene, although much less so than the monomeric peroxycarbonates. All of these materials decompose upon heating to yield gaseous constituents which are as yet unidentified. The monomeric liquid peroxycarbonates often decompose spontaneously at room temperature. The unsaturated peroxycarbonates sometimes explode on standing. These compounds may be stored as a 10 to 15 percent solution in a suitable solvent such as ethylene glycol bis (allyl carbonate), ethylene glycol bis (ethyl carbonate), etc.

The percarbonates may be used as oxidizing agents for numerous purposes, such as in bleaching flour or other bleaching reactions, as driers for linseed, tung, soya bean and other oils of similar nature, sterilizing agents, etc. They are particularly effective as catalysts for the polymerization of unsaturated compounds, such as methyl methacrylate, vinyl acetate, styrene, butadiene, β-chlorobutadiene, allyl esters such as diallyl or dimethallyl phthalate, maleate, oxalate, succinate, etc., or ethylene glycol bis (allyl carbonate), or other compounds containing the polymerizable groups (—C=C—) or (—C≡C—) the following examples are illustrative.

*Example I*

1.6 grams of sodium peroxide was added during a period of 5 minutes to 3.6 grams of ethylene glycol bis (chloroformate) suspended in 25 cc. of water. The mixture was vigorously stirred and the temperature maintained at about 0° C. during the addition. After the addition was complete, the agitation and cooling was continued. After 45 minutes the mixture was filtered and a white solid was obtained which was a polymeric peroxide.

The product was washed with pyridine and then with water and was then air dried. Samples of the resulting product snapped mildly when heated and decomposed. This product liberated iodine from a potassium iodide in 25 percent acetic acid solution. It contained 10.42 percent active oxygen. It is sparingly soluble in ethylene glycol bis (allyl carbonate). A five percent solution thereof polymerizes upon heating to 70° C. for several hours.

Example II

A 6 percent aqueous solution of sodium peroxide containing 271 grams of sodium peroxide was added slowly to 116 grams of ethyl chloroformate with vigorous agitation while cooling the mixture to the temperature of about minus 10° C. The oil layer was separated, washed free of chlorides with water, and dried over sodium sulphate. The product was decanted from the sodium sulphate and at once dissolved in ethylene glycol bis (allyl carbonate) to form a 15 percent solution.

The percarbonate was an oily liquid which decomposes spontaneously upon standing at room temperature unless dissolved in a solvent. The compound liberates iodine from a 25 percent acetic acid solution of potassium iodide. The oily liquid was miscible with ethylene glycol bis (allyl carbonate), diethylene glycol bis (allyl carbonate), and diethylene glycol bis (methallyl carbonate) and was capable of catalyzing polymerization of such esters. It possessed a refractive index of 1.4017 and contained 16.47 percent active oxygen. The probable structure of this product is:

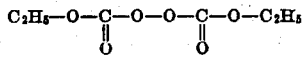

Example III

The process of Example I was repeated using diethylene glycol dichloroformate in lieu of ethylene glycol dichloroformate and a white adhesive paste was produced. This product decomposed upon heating. This product also exploded upon rubbing at room temperature. It was a polymeric peroxide which liberated iodine from acid solutions of aqueous potassium iodide.

Example IV

The procedure of Example II was repeated, using 18.5 grams of methyl chloroformate in lieu of ethyl chloroformate, and 9.35 grams of sodium peroxide. A mildly explosive oily liquid product was obtained. This was dissolved in ethylene glycol bis (allyl carbonate). Upon iodimetric analysis the compound was found to contain 16.1 percent active oxygen. The ester has the following probable structure:

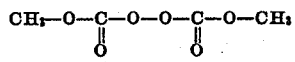

Example V

The procedure of Example II was repeated using 106.5 grams of allyl chloroformate in lieu of ethyl chloroformate, and 47.8 grams of sodium peroxide. On separating, washing with water, and drying over sodium sulphate, an oil was obtained which had a refractive index of 1.4339 at 20° C. and, on iodimetric analysis, was found to contain about 14.2 percent of active oxygen. It exploded on warming to room temperature. The ester has the following probable formula:

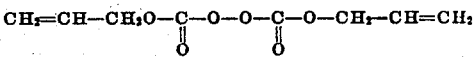

Example VI

A solution of 3.3 grams of 28.5 percent hydrogen peroxide and 2.2 grams of sodium hydroxide in about 20 cc. of water was slowly added to 6.8 grams of normal butyl chloroformate with vigorous stirring at a temperature below 5° C. The oily product after washing with water and drying over sodium sulphate had a refractive index of 1.4175 at 20° C. On iodimetric analysis it contained about 10.8% of active oxygen. It decomposed on heating. The ester has the following probable formula:

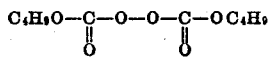

Example VII

The procedure of Example VI was repeated, using 9.0 g. of α-carbethoxyethyl chloroformate (the chloroformate of ethyl lactate). The product of the reaction was an oil, which, after washing with water and drying over sodium sulphate, had a refractive index of 1.4266 at 20° C. It contained about 8.8% of active oxygen, as compared with 9.94% required for the formula

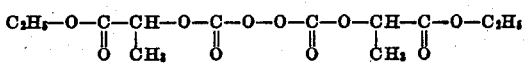

Example VIII

To 12.35 g. of isopropyl chloroformate was added with vigorous agitation a solution of 6.55 g. of 28.5% hydrogen peroxide solution and 8.80 g. of 50% sodium hydroxide solution in 35 cc. of water, the temperature being maintained below 5° C. The product of the reaction was an oily liquid which was separated, washed, and dried as in Example VII. It had a refractive index at 20° C. of 1.4034, and contained 7.63% of active oxygen, as determined iodimetrically. The compound has the following probable formula.

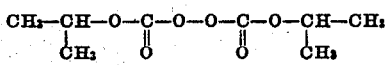

Example IX

The procedure of Example VIII was repeated, using 16.45 g. of tetrahydrofurfuryl chloroformate, 8.95 g. of 50% sodium hydroxide solution, and 6.3 g. of 29.7% hydrogen peroxide. The product was an oil, which after washing and drying as in Example VII contained about 11.2% of active oxygen, determined iodimetrically. It decomposed with evolution of gas at room temperature.

Example X

The procedure of Examples VIII and IX was followed using 15.55 grams of lauryl chloroformate in ether solution, and 3.15 grams of 29.7 per cent hydrogen peroxide and 4.50 grams of 50 percent sodium hydroxide in about 20 cc. of water. The ethereal solution resulting after reaction was analyzed iodimetrically after washing and drying and was found to contain a 35.7 percent yield of lauryl percarbonate, calculated from the formula $(C_{12}H_{25}OOCO—)_2$. The ether was vaporized and a solid waxy material was obtained. This material contains active oxygen and decomposes upon heating to 60–65° C.

Example XI

To 7.65 grams of cyclohexyl chloroformate, vigorously agitated to minus 10° C., was added a solution of 2.96 grams of 29.7% hydrogen peroxide and 4.25 grams of 50 percent sodium hydroxide in about 14 cc. of water. The temperature of the mixture was not allowed to rise above 3° C. The solid product of the reaction was washed with water and after drying melted at 38° C. It evolved gas on heating to about 59° C. It contained about 9.8 percent of active oxygen when analyzed in a slightly damp state.

Example XII

A solution of 3.21 grams of 29.7 percent hydrogen peroxide and 4.48 grams of 50 percent sodium hydroxide in about 25 cc. of water was added to 9.55 grams of benzyl chloroformate, the mixture being vigorously agitated during the addition and the temperature being maintained at minus 12° C. A gummy mass was obtained. This was filtered, washed successively with aqueous pyridine, water and alcohol. The white solid product melted at 90° C. It evolved gas when heated to about 100° C. Analysis showed the presence of 5.27 percent active oxygen. Benzyl percarbonate has a theoretical active oxygen content of 5.20 percent.

Although the present invention has been described with reference to the specific details of certain embodiments thereof, it is not intended that such details shall be regarded as limitations upon the scope of the invention, except insofar as included in the accompanying claims.

I claim:

1. Isopropyl peroxycarbonate.
2. A method of preparing an organic peroxycarbonate which comprises reacting a water solution of sodium peroxide with an ester of a haloformic acid.
3. A method of preparing an organic peroxycarbonate which comprises reacting a water solution of sodium peroxide with an ester of chloroformic acid.
4. A method of preparing an organic peroxycarbonate which comprises reacting a water solution of sodium peroxide with an alkyl chloroformate.
5. A method of preparing isopropyl peroxycarbonate which comprises reacting a water solution of sodium peroxide with isopropyl chloroformate at a temperature below 15° C.

FRANKLIN STRAIN.